United States Patent Office 2,930,804
Patented Mar. 29, 1960

2,930,804

11α-SULFONYLOXY STEROIDS OF THE PREGNANE SERIES

Josef Fried, Princeton, N.J., assignor to Olin Mathieson Chemical Corporation, a corporation of Virginia No Drawing. Original application March 10, 1954, Serial No. 417,489, now Patent No. 2,852,511, dated September 16, 1958. Divided and this application April 2, 1958, Serial No. 725,786

8 Claims. (Cl. 260—397.3)

This application is a division of my application Serial No. 417,489, filed March 10, 1954, now Patent No. 2,852,511, granted September 16, 1958, which in turn is a continuation-in-part of my application Serial No. 343,243, filed March 18, 1953, and now abandoned.

This invention relates to the synthesis of valuable steroids.

One of the objects of this invention is the provision of an advantageous process of preparing new intermediates useful in preparing 11β-hydroxy and 11-keto steroids of the pregnane (including pregnene) series, especially cortisone and hydrocortisone.

Another object of this invention is the provision of certain compounds useful in the preparation of physiologically active steroids.

The compounds of this invention comprise 11α-sulfonyloxy steroids of the pregnane series.

The process of this invention essentially comprises converting an 11α-hydroxy steroid of the pregnane series into an 11α-sulfonic acid ester thereof, especially the 11α-tosylate or 11α-mesylate thereof and converting the latter into the corresponding $\Delta^{9,11}$-compound. These $\Delta^{9,11}$-compounds can then be converted into the corresponding 9α-halo-11β-hydroxy compounds as disclosed in said application Serial No. 417,489, now U.S. Patent No. 2,852,511.

Among the compounds of this invention are those of the general formula

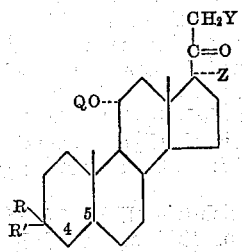

the 4,5 position being double-bonded or saturated, wherein R is —H, R' is —OH, or together R and R' is =O or a group convertible thereto by hydrolysis, Q is an organic sulfonyl radical, Y is a member of the class consisting of —H, and —O-(acyl), and Z is a member of the class consisting of —H and (α) —OH. [Among the groups convertible to a keto group are the acetal, especially cyclic acetal, groups.]

The 11α-sulfonyloxy-steroids may be obtained from the corresponding 11α-hydroxy steroid by reaction with the appropriate sulfonyl halide. In the case of compounds containing a 21-hydroxy group, this is done after protection of this group by forming an ester (especially lower fatty acid ester) thereof, e.g., by acetylation with acetic anhydride in the presence of pyridine. These reactants include, inter alia, alkylsulfonyl halides (such as methanesulfonyl chloride) and arylsulfonyl halides (such as p-bromo-benzenesulfonyl chloride and p-toluene-sulfonyl chloride). The preferred reagents are methanesulfonyl and p-toluenesulfonyl halides, the resulting esters being referred to respectively as "mesylates" and "tosylates."

The conversion of the 11α-sulfonic acid esters of the steroids into the corresponding $\Delta^{9,11}$-compound is best effected by heating the ester with an alkali metal salt of a lower fatty acid in a substantially anhydrous liquid lower fatty acid, e.g., (anhydrous) sodium acetate in (glacial) acetic acid, or potassium formate in formic acid. This conversion may also be effected by treatment with sodium iodide, potassium iodide or lithium bromide in acetone or glacial acetic acid, preferably the latter. These $\Delta^{9,11}$-compounds are then converted to the corresponding 9α-bromo-11β-hydroxy derivative by the method disclosed in application Serial No. 417,489.

Among the 11α-hydroxy steroids of the pregnane series utilizable in the process of this invention are $\Delta^4$-pregnene-11α,17α,21-triol-3,20-dione (also known as 11-epi-17α-hydroxy-corticosterone, or epi F), 11α-hydroxyprogesterone, 11α,17α-dihydroxyprogesterone, and epicorticosterone. The preparation of these compounds is disclosed, for example in J. Am. Chem. Soc., 74, 3962 (1952).

For a clearer understanding of the foregoing general and following detailed description of the invention, reference is made to the following schematic analysis (employing representative reagents, "Ts" being p-toluene sulfonyl, and "Ms" being methanesulfonyl):

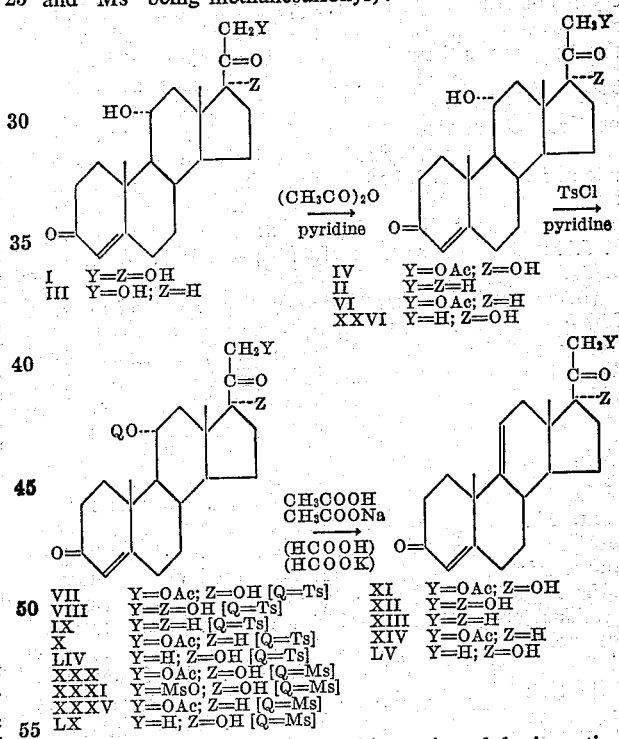

| | |
|---|---|
| I | Y=Z=OH |
| III | Y=OH; Z=H |
| IV | Y=OAc; Z=OH |
| II | Y=Z=H |
| VI | Y=OAc; Z=H |
| XXVI | Y=H; Z=OH |

| | |
|---|---|
| VII | Y=OAc; Z=OH [Q=Ts] |
| VIII | Y=Z=OH [Q=Ts] |
| IX | Y=Z=H [Q=Ts] |
| X | Y=OAc; Z=H [Q=Ts] |
| LIV | Y=H; Z=OH [Q=Ts] |
| XXX | Y=OAc; Z=OH [Q=Ms] |
| XXXI | Y=MsO; Z=OH [Q=Ms] |
| XXXV | Y=OAc; Z=H [Q=Ms] |
| LX | Y=H; Z=OH [Q=Ms] |
| XI | Y=OAc; Z=OH |
| XII | Y=Z=OH |
| XIII | Y=Z=H |
| XIV | Y=OAc; Z=H |
| LV | Y=H; Z=OH |

The following examples are illustrative of the invention (all temperatures being in centigrade, and all dilutions with water unless indicated otherwise):

EXAMPLE 1

*Preparation of $\Delta^{4,9(11)}$-pregnadiene-17α,21-diol-3,20-dione 21-acetate (XI)*

(a) *Epi-F 21-acetate (IV) from epi - F ($\Delta^4$ - pregnene-11α,17α,21-triol-3,20-dione) (I).*—To a solution of 50 g. pure epi-F [M.P. 217°, $[\alpha]_D^{23}+117°$ (CHCl$_3$)] in 200 ml. anhydrous pyridine immersed in an ice bath is added drop-wise, with stirring, a solution of 14.3 ml. acetic anhydride in 40 ml. of pyridine. Upon completion of the addition, requiring about two hours, the mixture is kept at 0° for four more hours, and is then allowed to warm up to room temperature (23°) overnight. The acetylation mixture is then concentrated in vacuo until most of the pyridine and acetic anhydride has evaporated, the resulting residue being dissolved in chloroform and the chloroform solution washed in the order given with water, dilute hydrochloric acid, dilute sodium bicarbonate and again with water. The chloroform solution is dried with sodium sulfate and the solvent removed in vacuo. The dried amorphous residue (about 69 g.), which represents the essentially pure 21-acetate of epi-F, is used in the following reaction without further purification.

(b) $\Delta^4$-pregnene-$11\alpha,17\alpha,21$ - triol - $3,20$ - dione $11\alpha$-tosylate 21-acetate (VII) from $\Delta^4$-pregnene-$11\alpha,17\alpha,21$-triol-$3,20$-dione 21-acetate (IV).—The amorphous residue obtained in a (about 69 g.) is dissolved in 250 ml. anhydrous pyridine, and to the resulting solution immersed in an ice bath there is added drop-wise, with stirring, a solution of 70 g. pure p-toluenesulfonyl chloride in 100 ml. alcohol-free chloroform. The addition requires about two hours, after which the reaction mixture is allowed to remain at 0° for another four hours, and eventually at room temperature overnight. Ten grams of ice is added, and after one-half hour the solution is concentrated in vacuo to a small volume. The resulting residue is taken up in chloroform and water, and the chloroform solution is washed with cold dilute hydrochloric acid, dilute sodium bicarbonate and finally with water. The chloroform solution is dried over sodium sulfate and evaporated to dryness in vacuo. The crystalline residue (about 88.4 g.) is triturated with 200 ml. absolute ethanol, and the mixture is filtered after short cooling in the refrigerator. The first crop of crystals amounts to about 58.6 g., and melts at about 165–166° (dec.). An additional 5.6 g. of material is obtained by concentration of the mother liquors. A small sample, recrystallized for analysis from ethyl acetate and dried at 56°, had the following properties: M.P., about 165.5–166°; $[\alpha]_D^{23}+106°$ (c., 1.0 in CHCl$_3$); analysis [calculated for C$_{30}$H$_{38}$O$_8$S: C, 64.51; H, 6.81; S, 5.73; found (approximately): C, 64.55; H, 6.84; S, 5.77].

(b: alternative) Deacetylation of $\Delta^4$-pregnene-$11\alpha,17\alpha,21$-triol-$3,20$-dione $11\alpha$-tosylate 21-acetate (VII).—To a solution of 115 mg. $\Delta^4$-pregnene-$11\alpha,17\alpha,21$-triol-$3,20$-dione $11\alpha$-tosylate 21-acetate in 1 ml. of chloroform is added 5.5 ml. methanol. The resulting mixture is warmed to 40°, and to it is added a solution of 86 mg. potassium bicarbonate in 1.6 ml. water. The yellow solution is allowed to remain at room temperature for 18 hours, and after the addition of 2 ml. water, is concentrated in vacuo to small volume. The residual mixture is extracted with chloroform and the chloroform solution is washed with water and dried over sodium sulfate. Removal of the solvent by evaporation leaves a residue (about 119 mg.) which crystallizes readily from acetone. The pure $\Delta^4$-pregnene-$11\alpha,17\alpha,21$-triol-$3,20$-dione $11\alpha$-tosylate (VIII) obtained has the following properties: M.P., about 130.5–131° (dec.); $[\alpha]_D^{23}+70°$ (c., 1.0 in CHCl$_3$); analysis [calculated for C$_{28}$H$_{36}$O$_7$S: C, 65.12; H, 6.97; found (approximately): C, 65.29; H, 7.22].

A sample of this $\Delta^4$-pregnene-$11\alpha,17\alpha,21$-triol-$3,20$-dione $11\alpha$-tosylate, on reacetylation with pyridine and acetic anhydride yields the 21-acetate (VII), M.P. 164–166° (dec.).

(c) $\Delta^{4,9(11)}$-pregnadiene-$17\alpha,21$-diol - $3,20$ - dione 21-acetate (XI) from $\Delta^4$-pregnane-$11\alpha,17\alpha,21$-triol-$3,20$-dione $11\alpha$-tosylate 21-acetate (VII).—A solution of 58.6 g. $\Delta^4$-pregnene-$11\alpha,17\alpha,21$-triol-$3,20$-dione $11\alpha$-tosylate 21-acetate and 117.2 g. anhydrous sodium acetate in one 1. of glacial acetic acid is heated under reflux for one hour. After evaporation of most of the acetic acid in vacuo, the residue is taken up in chloroform and extracted with water then with dilute sodium bicarbonate and again with water. The chloroform solution containing the desired $\Delta^{4,9(11)}$-pregnadiene-$17\alpha,21$-diol-$3,20$-dione 21-acetate (XI) is dried over sodium sulfate, and the chloroform is removed in vacuo. The crystalline residue (about 40.6 g.) is triturated with 140 ml. of acetone, and the resulting suspension is filtered with suction. Recrystallization of the dried crystals (about 33 g.) from ethyl acetate yields pure $\Delta^{4,9(11)}$-pregnadiene-$17\alpha,21$-diol-$3,20$-dione 21-acetate, having the following properties: M.P., about 234–235.5°, $[\alpha]_D^{26}+117°$ (c., 1.0 in CHCl$_3$) [calculated for C$_{23}$H$_{30}$O$_5$: C, 71.50; H, 7.77; found (approximately): C, 71.57; H, 7.85].

(c: alternative) $\Delta^{4,9(11)}$-pregnadiene-$17\alpha,21$-diol - $3,20$-dione 21-acetate is also prepared by refluxing a solution of 150 mg. $\Delta^4$-pregnene-$11\alpha,17\alpha,21$-triol-$3,20$-dione $11\alpha$-tosylate 21-acetate and 250 mg. of potassium formate in 215 ml. 98% formic acid for one hour, and treating the resulting mixture as described in c. $\Delta^{4,9(11)}$-pregnadiene-$17\alpha,21$-diol-$3,20$-dione 21-acetate can then be converted to $9\alpha$-bromo-$\Delta^4$-pregnene-$11\beta,17\alpha,21$-triol-$3,20$-dione 21-acetate as detailed in Example 1 of application Serial No. 417,489.

EXAMPLE 2

Preparation of $\Delta^{4,9(11)}$-pregnadiene-$3,20$-dione (XIII)

(a) $11\alpha$-tosyloxyprogesterone (IX) from $11\alpha$-hydroxyprogesterone (II).—376 mg. $11\alpha$-hydroxyprogesterone is tosylated in 3 ml. anhydrous pyridine with 292 mg. p-toluenesulfonyl chloride, as described hereinbefore for epi-F (Example 1, section b). 442 mg. of crude tosylate is obtained, which after crystallization from absolute ethanol yields about 340 mg. of crystals. The pure $11\alpha$-tosyloxyprogesterone is obtained by an additional crystallization from ethanol, and has the following properties: M.P., about 154–157° (dec.); $[\alpha]_D^{24}+121°$ (c., 0.97 in CHCl$_3$); and analysis [calculated for C$_{28}$H$_{36}$O$_5$S: C, 69.42; H, 7.43; S, 6.61; found (approximately): C, 69.23; H, 7.25; S, 6.61].

(b) $\Delta^{4,9(11)}$-pregnadiene-$3,20$-dione (XIII) from $11\alpha$-tosyloxyprogesterone (IX).—84 mg. $11\alpha$-tosyloxyprogesterone is reacted with anhydrous sodium acetate (167 mg.) in glacial acetic acid (3 ml.) and the reaction mixture worked up as described hereinbefore in Example 1. The resulting product about (51 mg.) cannot be purified solely by crystallization. It is therefore dissolved in 1 ml. benzene and 4 ml. hexane, and chromatographed on 1 g. sulfuric acid-washed alumina. A mixture of 1 part benzene and 4 parts hexane elutes about 39 mg. of $\Delta^{4,9(11)}$-pregnadiene-$3,20$-dione, which after recrystallization from ether-hexane has the following properties: M.P., about 121–123°; $[\alpha]_D^{23}+151°$ (c.,0.85 in acetone); $+171°$ (c., 0.58 in CHCl$_3$). Analysis [calculated for C$_{21}$H$_{28}$O$_2$: C, 80.77; H, 8.98; found (approximately) C, 81.00, H, 8.84].

Shoppee and Reichstein (Helv., 24, 351 (1941)) have reported a M.P. of 122° and an $[\alpha]_D+145°$ for this substance.

(a: alternative) $11\alpha$-hydroxyprogesterone may be converted into $11\alpha$-mesyloxyprogesterone by reaction with methanesulfonyl chloride as described in Example 5 hereinafter, and the latter converted to $\Delta^{4,9(11)}$-pregnadiene-$3,20$-dione in the same manner as $11\alpha$-tosyloxyprogesterone.

EXAMPLE 3

Preparation of $\Delta^{4,9(11)}$-pregnadiene-$21$-ol-$3,20$-dione 21-acetate (XIV)

(a) Epicorticosterone 21-acetate (VI) from epicorticosterone (III).—347 mg. of epicorticosterone is acetylated in 4 ml. anhydrous pyridine with 0.1035 ml. acetic anhydride at 0° for 18 hours. The practically pure, amorphous epicorticosterone acetate (about 400 mg.) is isolated essentially as described hereinbefore in Example 1.

(b) Epicorticosterone 21-acetate $11\alpha$-tosylate (X) from epicorticosterone 21-acetate (VI).—400 mg. of the amorphous epicorticosterone 21-acetate obtained in a is treated with 400 mg. of p-toluenesulfonyl chloride in 5 ml. pyridine, the reaction mixture worked up as described hereinbefore in Example 1. The resulting tosylate (about 492 mg.) cannot be obtained in crystalline form. It is therefore subjected to the next step without further purification.

(c) $\Delta^{4,9,(11)}$-pregnadiene-21-ol-3,20-dione 21-acetate (XIV) from Epicorticosterone 21-acetate 11α-tosylate (X).—492 mg. of epicorticosterone 21-acetate 11α-tosylate as obtained in b is treated with 986 mg. anhydrous sodium acetate in 9 ml. glacial acetic acid and the reaction mixture worked up as described hereinbefore in Example 1. The residue (about 390 mg.) crystallizes readily from acetone, and after another crystallization from that solvent yields about 100 mg. of pure $\Delta^{4,9(11)}$-pregnadiene-21-ol-3,20-dione acetate having the following properties: M.P., about 158.5–159.5°; $[\alpha]_D^{23}+128°$ (c., 0.98 in acetone) and $+150°$ (c., 1.13 in CHCl$_3$); analysis [calculated for $C_{23}H_{30}O_4$: C, 74.56; H, 8.16; found (approximately): C, 74.79; H, 8.11].

Shoppee and Reichstein (Helv., 26, 1316 (1943)) report M.P. 159° and $[\alpha]_D^{18}+129°$ (acetone) for the compound.

An additional amount of pure product is obtained by chromatographing the mother liquors from benzene (5 ml.) on alumina 5 g. and eluting the $\Delta^{4,9(11)}$-pregnadiene-21-ol-3,20-dione acetate with benzene.

EXAMPLE 4

$\Delta^4$-pregnene-11α,17α,21-triol-3,20-dione 11α-mesylate 21-acetate (XXX) from $\Delta^4$-pregnene-11α,17α,21-triol-3,20-dione 21 acetate (IV)

264 g. of the amorphous residue of $\Delta^4$-pregnene-11α,17α,21-triol-3,20-dione 21-acetate (IV), obtained in section a of Example 1, is dissolved in 1050 ml. chloroform and 255 ml. pyridine, and to the resulting solution immersed in an ice bath is added over a twenty-minute period a solution of 80 ml. pure methanesulfonyl chloride in 250 ml. chloroform. The resulting mixture is allowed to remain in the refrigerator for sixteen hours, after which time about 10 g. of ice is added. After an additional one-half hour at 0°, the mixture is washed with water, and then with 1 N HCl until the last traces of pyridine are removed, and again with water; and this is followed by a dilute sodium bicarbonate wash and a third water wash. The chloroform solution is dried over sodium sulfate, and concentrated to approximately 200 ml. Upon addition of 1 liter absolute ethanol, crystallization ensues rapidly, and is allowed to go to completion in the refrigerator. Filtration produces a first crop of crystals (about 244 g.), and concentration of the mother liquors in vacuo gives a second crop (about 41 g.). The material obtained in this manner melts at 157–158°. An additional recrystallization affords analytically pure material having the following properties: M.P. about 159–160°, with browning; $[\alpha]_D^{23}+119°$ (c., 1.09 in CHCl$_3$); analysis [calculated for $C_{24}H_{34}O_8S$ (482.56): C, 59.73; H, 7.10; S, 6.64; found (approximately): C, 59.47; H, 7.13; S, 6.36]. This material can be converted into $\Delta^{4,9(11)}$-pregnadiene-17α,21-diol-3,20-dione 21-acetate (XI) as described in Example 1.

EXAMPLE 5

$\Delta^{4,9(11)}$-pregnadiene-17α,21-diol-3,20-dione (XII) from $\Delta^4$-pregnene-11α,17α,21-triol-3,20-dione 11α - tosylate 21-acetate (VII)

A solution containing 303 mg. $\Delta^4$-pregnene-11α,17α,21-triol-3,20-dione 11α-tosylate 21-acetate and 40 mg. of toluenesulfonic acid monohydrate in 25 ml. absolute methanol is refluxed for six hours. After the addition of 10 ml. of water, the mixture is concentrated in vacuo, and the residual aqueous suspension extracted with chloroform. The chloroform extract is washed with dilute sodium bicarbonate solution and with water, and dried over sodium sulfate. Crystallization of the resulting residue (about 22 mg.) from acetone and finally from 95% ethanol yields $\Delta^{4,9(11)}$-pregnadiene-17α,21-diol-3,20-dione, melting at about 244–247° (cf. section c: alternative, Example 1).

EXAMPLE 6

$\Delta^4$-pregnene-11α,17α,21-triol-3,20-dione 11α,21-dimesylate (XXXI) from epi-F (I)

To a solution of 10 g. epi-F (I) in 110 ml. anhydrous pyridine is added at 0° a solution of 6.6 ml. methanesulfonyl chloride in 10 ml. chloroform. The reaction mixture is allowed to remain at 0° for fifteen hours, after which 1 g. of ice is added. After an additional one-half hour at 0°, the mixture is concentrated in vacuo to a small volume. The resulting residue is taken up in chloroform and water, and the chloroform solution is washed with cold dilute hydrochloric acid, dilute sodium bicarbonate solution, and finally with water. The chloroform solution is then dried over sodium sulfate and evaporated to dryness in vacuo. The crystalline residue (about 12.4 g.) is recrystallized from 95% ethanol, yielding the analytically pure dimesylate, have the following properties: M.P. about 162° (dec.); $[\alpha]_D^{23}+97°$ (c., 0.98 in dioxane); analysis [calculated for $C_{23}H_{34}O_9S_2$ (502.62): C, 53.26; H, 6.60; S, 12.36; found (approximately): C, 53.42; H, 6.29; S, 11.00]. The dimesylate can be converted into $\Delta^{4,9(11)}$-pregnadiene-17α,21-diol-3,20-dione 21-acetate (XI) according to the procedure described in section c of Example 1.

EXAMPLE 7

Preparation of $\Delta^{4,9(11)}$-pregnadiene-21-ol-3,20-dione 21-acetate (XIV)

(a) Epi - corticosterone 11α - mesylate 21 - acetate (XXXV) from epi-corticosterone 21-acetate (VI).—To a solution of 3.27 g. epi-corticosterone 21-acetate, obtained as described in section a of Example 3, in 40 ml. pyridine is added at 0° a solution of 0.953 ml. of methanesulfonyl chloride in 7 ml. chloroform. After the reaction mixture has stood in the refrigerator for 17 hours, a few small pieces of ice are added, and the mixture is allowed to remain at 0° for an additional half hour. The mixture is then concentrated to small volume in vacuo, taken up with chloroform and the chloroform solution extracted with dilute acid, sodium bicarbonate solution and finally with water. The chloroform solution is then dried over sodium sulfate and evaporated to dryness in vacuo. A residue of about 3.73 g. results, which crystallizes from absolute ethanol. Pure epicorticosterone 11α-mesylate 21-acetate has the following properties: M.P. about 156–157° (dec.); $[\alpha]_D^{23}+144°$ (c., 0.92 in CHCl$_3$); analysis [calculated for $C_{24}H_{34}O_6S$ (466.57): C, 61.78; H, 7.34; found (approximately): C, 62.52; H, 7.07].

(b) $\Delta^{4,9(11)}$ - pregnadiene-21-ol-3,20-dione 21 - acetate (XIV) from epi-corticosterone 11α-mesylate 21-acetate (XXXV).—A solution of 1.92 g. epi-corticosterone 11α-mesylate 21-acetate and 3.84 g. anhydrous sodium acetate in 40 ml. glacial acetic acid is refluxed for one hour. The reaction mixture is worked up as described in section c of Example 3. Crystallization of the resulting residue (about 1.66 g.) from acetone affords $\Delta^{4,9(11)}$-pregnadiene-21-ol-3,20-dione 21-acetate in 84% yield.

EXAMPLE 8

Preparation of $\Delta^{4,9(11)}$-pregnadiene-17α-ol-3,20-dione (LV)

(a) 11α-tosyloxy-17α-hydroxyprogesterone (LIV) from 11α,17α-dihydroxyprogesterone (XXVI).—1.2 g. 11α,17α-dihydroxy-progesterone is treated with 1.4 g. p-toluene sulfonyl chloride, and the reaction mixture worked up as described in section b of Example 1. The resulting tosylate (weighing 1.7 g.), after recrystallization from acetone, has the following properties: M.P. about 143–146° (dec.); $[\alpha]_D^{23} +48°$ (c., 0.29 in $CHCl_3$);

$\lambda_{max.}^{ethanol}$ 229 m$\mu$ ($\epsilon=26,500$), 274 m$\mu$ ($\epsilon=606$), 285 m$\mu$ ($\epsilon=305$).

$\lambda_{max.}^{Nujol}$ 3.03 $\mu$ (OH)

5.88 $\mu$, 5.99 $\mu$, 6.05$\mu$; analysis: [calculated for $C_{28}H_{36}O_5S$ (500.63): C, 67.17; H, 7.25; S, 6.44; found (approximately): C, 67.08; H, 7.52; S, 6.35].

(a: alternative) *11α-mesyloxy-17α-hydroxyprogesterone (LX) from 11α-17α-dihydroxyprogesterone (XXVI).* —117 mg. 11α,17α-dihydroxyprogesterone is dissolved in 5 ml. pyridine, cooled to 0°, and 0.04 ml. methanesulfonyl chloride (1.5 equivalents) is added. The mixture is left standing in the icebox for 8 hours. The excess methanesulfonyl chloride is then destroyed with ice, the mixture dilute with chloroform, washed with 1 N HCl, sodium bicarbonate solution and water, dried over sodium sulfate, and evaporated. On crystallization from ethanol there is obtained about 65 mg. of the product, having the following properties: M.P. about 150–152° (dec.); $[\alpha]_D^{23} +64°$ (c.=.49 in $CHCl_3$);

$\lambda_{max.}^{EtOH}$ 238 m$\mu$ ($\epsilon=18,200$), 285 m$\mu$ ($\epsilon=277$);

$\lambda_{max.}^{Nujol}$ 5.90 $\mu$, 6.04 $\mu$, 6.11 $\mu$, 6.24 $\mu$ analysis [calculated for $C_{22}H_{32}O_6S$ (424.54): C, 62.24; H. 7.60; S, 7.55; found: C, 62.11; H, 7.71; S, 7.11]. The mother liquors yield about 50 mg. additional product.

(b) *$\Delta^{4,9(11)}$-pregnadiene-17α-ol-3,20-dione (LV) from 11α-tosyloxy-17α-hydroxyprogesterone (LIV).* —1.19 g. 11α-tosyloxy-17α-hydroxyprogesterone is treated with 2.4 g. anhydrous sodium acetate in 25 ml. glacial acetic acid, and the reaction mixture worked up as described in section c of Example 1. The residue (about 693 mg.) crystallizes readily from acetone, yielding about 520 mg. pure $\Delta^{4,9(11)}$-pregnadiene-17α-ol-3,20-dione, having the following properties: M.P. about 214–216°, $[\alpha]_D^{23} +67°$ (c., 0.82 in $CHCl_3$);

$\lambda_{max.}^{alc.}$ 239 m$\mu$ ($\epsilon=18,450$);

$\lambda_{max.}^{Nujol}$ 2.88 $\mu$ (OH)

5.87 $\mu$ (20-ketone), 5.99 $\mu$ 6.04 $\mu$ ($\Delta^4$-3-ketone); analysis [calculated for $C_{21}H_{28}O_3$ (328.44): C, 76.79; H, 8.59; found (approximately): C, 76.52; H, 8.46].

Alternatively, 11α-mesyloxy-17α-hydroxyprogesterone can be converted into $\Delta^{4,9(11)}$-pregnadiene-17α-ol-3,20-dione by the foregoing procedure.

The invention may be otherwise variously embodied with the scope of the appended claims.

I claim:
1. A process for the production of 9(11)-dehydroprogesterone which comprises reacting 11α-(hydrocarbonsulfonyloxy)-progesterone with an alkali-metal salt of a lower fatty acid to produce 9(11)-dehydroprogesterone.

2. A process for the production of a 9(11)-dehydro steroid of the pregnane series which comprises reacting an 11α-(organic sulfonyloxy) steroid of the pregnane series with an alkali metal salt of a lower fatty acid to produce the 9(11)-dehydro steroid.

3. A steroid of the general formula

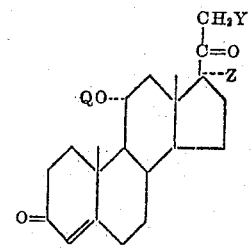

wherein Q is an organic sulfonyl radical, Y is selected from the class consisting of hydrogen, lower alkanoyloxy and lower alkane sulfonyloxy, and Z is selected from the class consisting of hydrogen and hydroxy.

4. 11α-hydroxyprogresterone mesylate.
5. 11α-hydroxyprogresterone tosylate.
6. $\Delta^4$-pregnene-11α, -17α,21-triol-3,20-dione 11α,21-dimesylate.
7. $\Delta^4$-pregnene-11α,17α,21-triol-3,20-dione 11α-tosylate 21-acetate.
8. $\Delta^4$-pregnene-11α,17α,21-triol-3,20-dione 11α-mesylate 21-acetate.

References Cited in the file of this patent
UNITED STATES PATENTS 2,647,134    Hogg et al. ------------ July 28, 1953

OTHER REFERENCES

Meystre et al.: Chem. Abst., vol. 43, col. 1783 (1949).